United States Patent
Tang et al.

(10) Patent No.: US 8,619,973 B2
(45) Date of Patent: Dec. 31, 2013

(54) SYSTEM AND DEVICE FOR DATA ENCRYPTION AND RECOVERY

(75) Inventors: Hao Tang, SiChuan (CN); Jinsong Ji, Shanghai (CN); William Herz, Hayward, CA (US)

(73) Assignee: Nvidia Corporation, Santa Clara, CA (US)

( * ) Notice: Subject to any disclaimer, the term of this patent is extended or adjusted under 35 U.S.C. 154(b) by 832 days.

(21) Appl. No.: 12/502,166

(22) Filed: Jul. 13, 2009

(65) Prior Publication Data

US 2010/0150339 A1    Jun. 17, 2010

(30) Foreign Application Priority Data

Dec. 15, 2008    (CN) .......................... 2008 1 0184073

(51) Int. Cl.
     *G06F 21/00*      (2013.01)

(52) U.S. Cl.
     USPC ............................. 380/28; 380/255; 713/189

(58) Field of Classification Search
     USPC .......................................................... 380/28
     See application file for complete search history.

(56) References Cited

U.S. PATENT DOCUMENTS

| | | | |
|---|---|---|---|
| 6,870,929 B1 * | 3/2005 | Greene ........................... | 380/28 |
| 7,228,474 B2 * | 6/2007 | Williams et al. .............. | 714/726 |
| 2003/0156720 A1 * | 8/2003 | Ishiwaki ....................... | 380/268 |

\* cited by examiner

*Primary Examiner* — Yogesh Paliwal
(74) *Attorney, Agent, or Firm* — Patterson & Sheridan, L.L.P.

(57) ABSTRACT

The present invention provides a flexible encryption device, comprising N encryption units connected in series for encrypting N-bit input data, each one of the N encryption units further comprising an exclusive-OR gate for receiving an input data; and a flip-flop connected coupled to the exclusive-OR gate. Furthermore, the present invention also provides the data transferring system that can be easily modified without the needs of manual intervention.

20 Claims, 3 Drawing Sheets

SYSTEM AND DEVICE FOR DATA ENCRYPTION AND RECOVERY

CROSS-REFERENCE TO RELATED APPLICATIONS

This application claims Priority of Chinese patent application number 200810184073.5, filed Dec. 15, 2008, which is herein incorporated by reference.

BACKGROUND OF THE INVENTION

1. Field of the Invention

The present invention relates to data encryption and recovery; more specifically, the present invention relates to data encryption and recovery with multiple input signature register.

2. Background of the Invention

Data encryption is required in many situations, such as data transfer and data storage, to ensure the security of the information. Encryption can be very complicated; and, as a result, the encryption devices are getting larger, more time consuming and very inflexible. The encryption parameters may need to be changed to facilitate different conditions. And it is very difficult to modify such a complicated encryption device just to alter several parameters. Furthermore, having a complicated encryption device also means that the recovery device will also be large, slow and inflexible.

FIG. 1 illustrates a prior art data transfer system. The sender transfers programmed data to the receiver, which has a check device. The check device in the receiver confirms whether the programmed data is correct. If the programmed data is confirmed to be correct, the data will then be processed. If the programmed data is not correct, the receiver will halt. Although the programmed data cannot be read, Bus 1 can be uncovered and a simulate device is used to simulate the same data through another bus, Bus 2. Therefore, the simulation action exposes the programmed data and risks data integrity.

It is required to have an encryption device that is easy to implement, flexible and reliable, and also a data transferring system that can be easily modified without the needs of manual intervention.

SUMMARY OF THE INVENTION

An embodiment of the present invention provides an encryption device to solve the problem of the conventional designs and provides a flexible encryption device. The embodiment of the present invention provides an encryption device, comprising N encryption units connected in series for encrypting N-bit input data, each one of the N encryption units further comprising an exclusive-OR gate for receiving an input data; and a flip-flop connected coupled to the exclusive-OR gate.

To solve the problem of the prior technology, another embodiment of the present invention provides a recovery device, comprising N recovery units for recovering N-bit input data, each one of the N recovery units further comprising a flip-flop for receiving an input data; and an exclusive-OR gate coupled to the flip-flop.

To solve the problem of the prior technology, another embodiment of the present invention also provides an encryption system, comprising a configuration file comprising encryption information; and an encryption device selected by the configuration file, comprising N recovery units for recovering N-bit input data, each one of the N recovery units further comprising a flip-flop for receiving an input data; and an exclusive-OR gate coupled to the flip-flop.

To solve the problem of the prior technology, another embodiment of the present invention also provides a recovery system, comprising a configuration file comprising recovery information; and a recovery device, comprising N recovery units for recovering N-bit input data, each one of the N recovery units further comprising a flip-flop for receiving an input data; and an exclusive-OR gate coupled to the flip-flop.

DETAILED DESCRIPTION OF THE INVENTION

Figure 1:
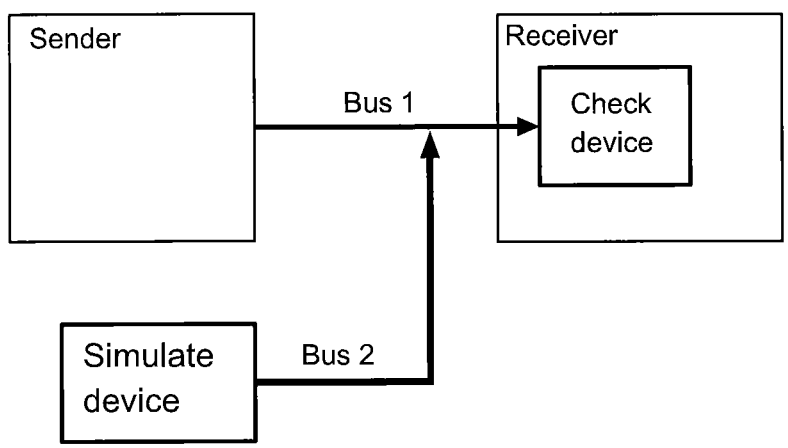
FIG. 1 illustrates a prior art data transfer system.
Figure 2:
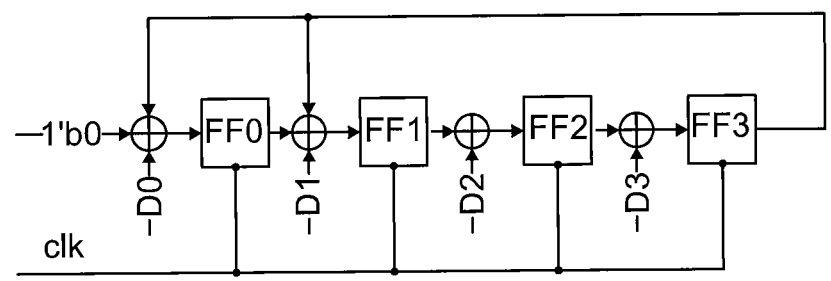
FIG. 2 illustrates an encryption device according to an embodiment of the invention.

FIG. 2 illustrates an encryption device according to an embodiment of the present invention. The encryption device comprises four flip-flips FF0-FF3, wherein each one of the flip-flips is coupled to an exclusive- or gate. The encryption device receives input data D0-D3 in parallel with the exclusive- or gates. Input data D0-D3 are inputted into the encryption device simultaneously at every clock edge; and flip-flips FF0-FF3 are updated also at every clock edge. When input data D0-D3 are periodical, the output of flip-flops FF0-FF3 is also a periodic pseudo-random series.

The example is shown in Table 1 below.

TABLE 1

| Timer | Input | | | | Output | | | |
|---|---|---|---|---|---|---|---|---|
| | D0 | D1 | D2 | D3 | FF0 | FF1 | FF2 | FF3 |
| 0 | 1 | 0 | 0 | 0 | 0 | 0 | 0 | 0 |
| 1 | 1 | 0 | 0 | 0 | 1 | 0 | 0 | 0 |
| 2 | 1 | 0 | 0 | 0 | 1 | 1 | 0 | 0 |
| 3 | 1 | 0 | 0 | 0 | 1 | 1 | 1 | 0 |
| 4 | 1 | 0 | 0 | 0 | 1 | 1 | 1 | 1 |
| 5 | 1 | 0 | 0 | 0 | 0 | 0 | 1 | 1 |
| 6 | 1 | 0 | 0 | 0 | 0 | 1 | 0 | 1 |
| 7 | 1 | 0 | 0 | 0 | 0 | 1 | 1 | 0 |
| 8 | 1 | 0 | 0 | 0 | 1 | 0 | 1 | 1 |
| 9 | 1 | 0 | 0 | 0 | 0 | 0 | 0 | 1 |
| 10 | 1 | 0 | 0 | 0 | 0 | 1 | 0 | 0 |
| 11 | 1 | 0 | 0 | 0 | 1 | 0 | 1 | 0 |
| 12 | 1 | 0 | 0 | 0 | 1 | 1 | 0 | 1 |
| 13 | 1 | 0 | 0 | 0 | 0 | 0 | 1 | 0 |
| 14 | 1 | 0 | 0 | 0 | 1 | 0 | 0 | 1 |
| 15 | 1 | 0 | 0 | 0 | 0 | 0 | 0 | 0 |
| 16 | ... | ... | ... | ... | 1 | 0 | 0 | 0 |
| 17 | | | | | ... | ... | ... | ... |

As shown in Table 1, the output series of the encryption device are seen as random series, therefore, they can be transferred or stored as encrypted data.

FIG. 2 illustrates the encryption device for 4-bit data for illustration purpose only. Persons skilled in the art should know that the encryption data size can be easily increased by modifying the encryption device. The present invention provides a flexible encryption structure that can be cascaded to facilitate different requirements. For example, two of the encryption device as shown in FIG. 2 can be cascaded to form an encryption device for 8-bit data.

Figure 3:
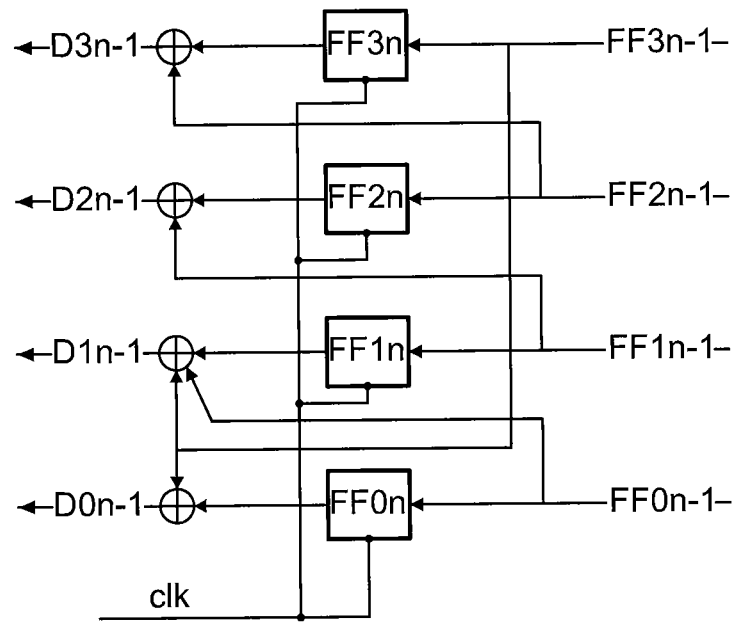
FIG. 3 illustrates a recovery device according to an embodiment of the invention.

Please refer to FIG. 3, which illustrates a recovery device according to another embodiment of the present invention. The recovery device is constructed according to the encryption algorithm. And according to Table 1 above, Equations 1-4 shown below are obtained.

$$FF0_n = D0_{n-1} \oplus FF3_{n-1} \quad \text{Equation 1}$$

$$FF1_n = D1_{n-1} \oplus FF0_{n-1} \oplus FF3_{n-1} \quad \text{Equation 2}$$

$$FF2_n = D2_{n-1} \oplus FF1_{n-1} \quad \text{Equation 3}$$

$$FF3_n = D3_{n-1} \oplus FF2_{n-1} \quad \text{Equation 4}$$

By rearranging Equations 1-4, Equations 5-8 are yielded.

$$D0_{n-1} = FF0_n \oplus FF3_{n-1} \quad \text{Equation 5}$$

$$D1_{n-1} = FF1_n \oplus FF0_{n-1} \oplus FF3_{n-1} \quad \text{Equation 6}$$

$$D2_{n-1} = FF2_n \oplus FF1_{n-1} \quad \text{Equation 7}$$

$$D3_{n-1} = FF3_n \oplus FF2_{n-1} \quad \text{Equation 8}$$

Therefore, the recovery device in FIG. 3 is formed according to Equations 5-8. The recovery device comprises four flip-flips $FF0_n$-$FF3_n$, wherein each one of the flip-flips is coupled to an exclusive- or gate. The encryption device receives input data $FF0_{n-1}$-$FF3_{n-1}$ in parallel with the exclusive- or gates. Input data $FF0_{n-1}$-$FF3_{n-1}$ are inputted into the encryption device simultaneously at every clock edge; and flip-flips $FF0_n$-$FF3_n$ are updated also at every clock edge. Table 2 illustrates the result of the recovery device by inputting the output series of Table 1.

TABLE 2

| Timer | Input | | | | Output | | | |
|---|---|---|---|---|---|---|---|---|
| | D0 | D1 | D2 | D3 | FF0 | FF1 | FF2 | FF3 |
| 0 | 1 | 0 | 0 | 0 | 0 | 0 | 0 | 0 |
| 1 | 1 | 0 | 0 | 0 | 1 | 0 | 0 | 0 |
| 2 | 1 | 0 | 0 | 0 | 1 | 1 | 0 | 0 |
| 3 | 1 | 0 | 0 | 0 | 1 | 1 | 1 | 0 |
| 4 | 1 | 0 | 0 | 0 | 1 | 1 | 1 | 1 |
| 5 | 1 | 0 | 0 | 0 | 0 | 0 | 1 | 1 |
| 6 | 1 | 0 | 0 | 0 | 0 | 1 | 0 | 1 |
| 7 | 1 | 0 | 0 | 0 | 0 | 1 | 1 | 0 |
| 8 | 1 | 0 | 0 | 0 | 1 | 0 | 1 | 1 |
| 9 | 1 | 0 | 0 | 0 | 0 | 0 | 0 | 1 |
| 10 | 1 | 0 | 0 | 0 | 0 | 1 | 0 | 0 |
| 11 | 1 | 0 | 0 | 0 | 1 | 0 | 1 | 0 |
| 12 | 1 | 0 | 0 | 0 | 1 | 1 | 0 | 1 |
| 13 | 1 | 0 | 0 | 0 | 0 | 0 | 1 | 0 |
| 14 | 1 | 0 | 0 | 0 | 1 | 0 | 0 | 1 |
| 15 | 1 | 0 | 0 | 0 | 0 | 0 | 0 | 0 |
| 16 | ... | ... | ... | ... | 1 | 0 | 0 | 0 |
| 17 | | | | | ... | ... | ... | ... |

As shown in Table 2, it is known that the input data series are recovered by the recovery device of FIG. 3. FIG. 3 illustrates the recovery device for 4-bit data for illustration purpose only. Persons skilled in the art should know that the encryption data size can be easily increased by modifying the recovery device. The present invention provides a flexible recovery structure that can be cascaded to facilitate different requirements. For example, two of the recovery device as shown in FIG. 3 can be cascaded to form a recovery device for 8-bit data.

Figure 4:
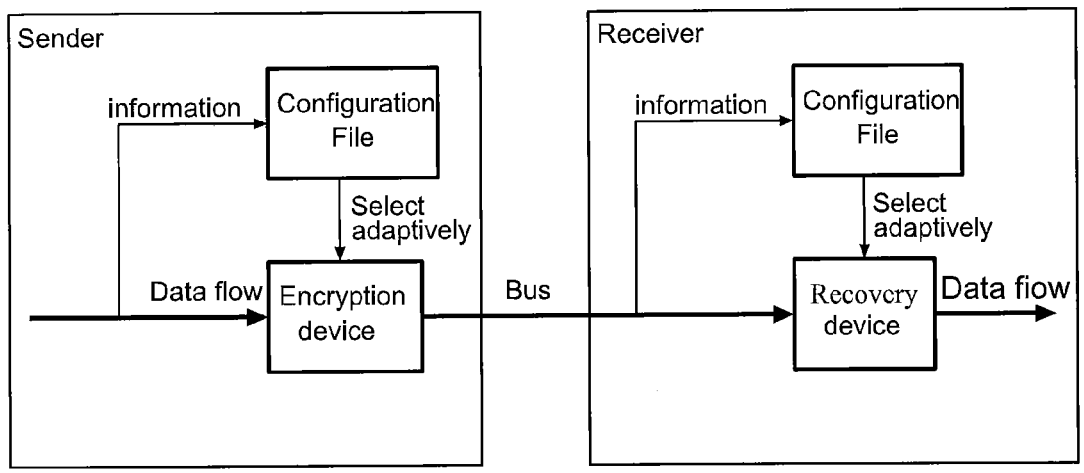
FIG. 4 illustrates a data transfer system according to another embodiment of the invention.

FIG. 4 shows a data transfer system according to another embodiment of the invention. The data transfer system solves the problem of prior art as described. The data transfer system comprises a sender and a receiver; wherein the sender comprises a configuration file and an encryption device; and the receiver comprises a recovery device and a configuration file. The configuration file in the sender is the same as the configuration file in the receiver; and the configuration file are stored with information, such as data size. On the basis of the information stored in the configuration file, an appropriate encryption device and a recovery device are selected. Therefore, the data transfer system of the present invention provides an automatic selection of the encryption device and a recovery device, which eliminates manual errors. Furthermore, the data being transferred is encrypted, so that even if the bus is uncovered, the data is safely protected by the encryption. Therefore, the data integrity is ensured. The configuration file also provides easy modification when the condition changes.

Figure 5:
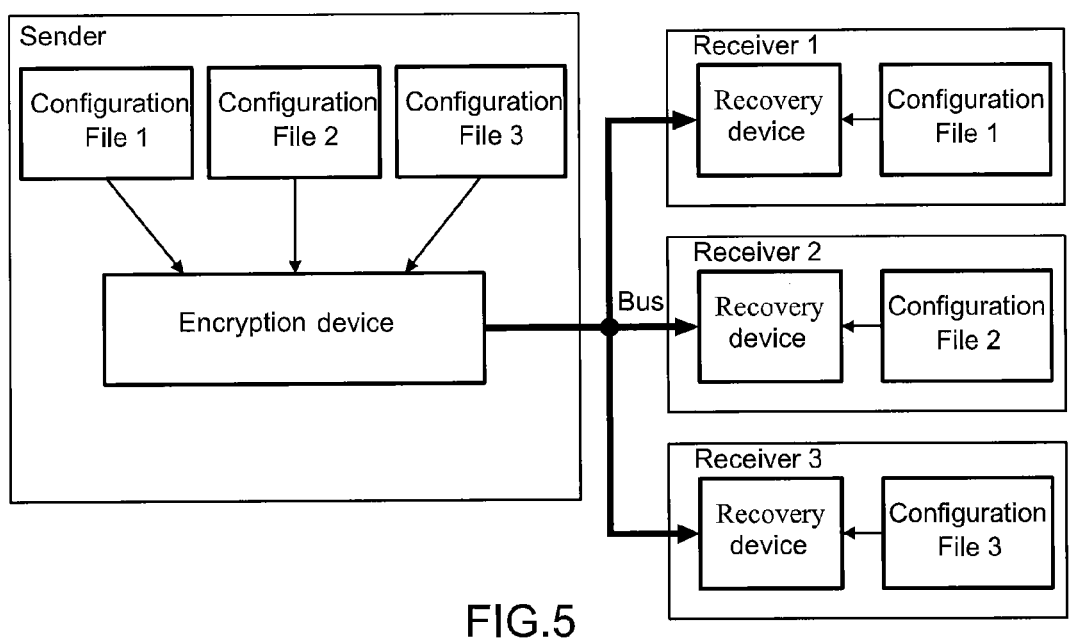
FIG. 5 illustrates a data transfer system with multiple receivers according to another embodiment of the invention.

The transfer system illustrated in FIG. 4 is also modified according to another embodiment of the invention. Referring to FIG. 5, which shows a transfer system with multiple receivers. The transfer system as illustrated comprises a sender and three receivers. The encryption device in the sender transfers different data to respective receiver at different time. The data is encrypted with respect to different configuration files and the encrypted data is decrypted with corresponding configuration file at the receiver. For example, a first set of data is encrypted according to the information in configuration file 1, a second set of data is encrypted according to the information in configuration file 2, and a third set of data is encrypted according to the information in configuration file 3. The encrypted data is then transferred via the same bus to the receivers. Receiver 1 receives the encrypted data and decrypts it with configuration file 1 to obtain the first set of data. The encrypted second and third sets of data are also sent to receiver 1; however, configuration file 1 provides decryption of the first set of data. Therefore, the second and third sets of data are discarded by receiver 1. Similarly, receiver 2 obtains the second set of data and discards irrelevant first and third sets of data. With the transfer system, the received information is also protected from being used by other receivers, which is essential for the mobile systems. Therefore, the transfer system as illustrated in FIG. 5 provides not only data transfer safety, but also prevents data from being read by other receivers when it is sent from the same sender.

Although the embodiments disclosed above are discussed in the scope of providing solutions in response to a need for encryption device, one of ordinary skill in the art can easily adopt the same circuitry for the providing of other type of purposes. Variations, modifications, and other implementations of what is described herein will occur to those of ordinary skill in the art without departing from the spirit and scope of the present invention as claimed. Accordingly, the present invention is to be defined not by the preceding illustrative description but instead by the spirit and scope of the following claims.

The invention claimed is:

1. An encryption device, comprising:
   a first exclusive-OR gate coupled to a first input data, a second exclusive-OR gate coupled to a second input data, a third exclusive-OR gate coupled to a third input data, and a fourth exclusive-OR gate coupled to a fourth input data; and
   a first flip-flop having a first input coupled to an output of the first exclusive-OR gate, a second flip-flop having a second input coupled to an output of the second exclusive-OR gate, a third flip-flop having a third input coupled to an output of the third exclusive-OR gate, and a fourth flip-flop having a fourth input coupled to an output of the fourth exclusive-OR gate;

wherein the second exclusive-OR gate receives as input an output from the first flip-flop and an output from the fourth flip-flop, and further directly receives as another input the second input data.

2. The encryption device according to claim 1, wherein the first exclusive-OR gate receives, as input, a constant 0 bit value, the first input data, and the output from the fourth flip-flop.

3. The encryption device according to claim 2, wherein the second exclusive-OR gate receives as input only the output from the fourth flip-flop, the output from the first flip-flop, and the second input data.

4. The encryption device according to claim 3, wherein the third exclusive-OR gate receives as input only the third input data and an output from the second flip-flop.

5. The encryption device according to claim 4, wherein the fourth exclusive-OR gate receives as input only the fourth input data and an output from the third flip-flop.

6. A recovery device, comprising:
a first exclusive-OR gate coupled to a fourth input data, a second exclusive-OR gate coupled to a first input data, a third exclusive-OR gate coupled to a second input data, and a fourth exclusive-OR gate coupled to a third input data; and
a first flip-flop having a first output coupled to the first exclusive-OR gate, a second flip-flop having a second output coupled to the second exclusive-OR gate, a third flip-flop having a third output coupled to the third exclusive-OR gate, and a fourth flip-flop having a fourth output coupled to the fourth exclusive-OR gate;
wherein the second exclusive-OR gate receives as input, the output from the second flip-flop, the first input data, and the fourth input data.

7. The recovery device according to claim 6, wherein the first exclusive-OR gate receives as input only the output from the first flip-flop and the fourth input data.

8. The recovery device according to claim 7, wherein the second exclusive-OR gate receives as input only the output from the second flip-flop, the first input data, and the fourth input data.

9. The recovery device according to claim 8, wherein the third exclusive-OR gate receives as input only the output from the third flip-flop and the second input data.

10. The recovery device according to claim 9, wherein the fourth exclusive-OR gate receives as input only the output from the fourth flip-flop and the third input data.

11. An encryption system, comprising:
a configuration file comprising encryption information; and
an encryption device selected by the configuration file, comprising:
a first exclusive-OR gate coupled to a first input data, a second exclusive-OR gate coupled to a second input data, a third exclusive-OR gate coupled to a third input data, and a fourth exclusive-OR gate coupled to a fourth input data; and
a first flip-flop having a first input coupled to an output of the first exclusive-OR gate, a second flip-flop having a second input coupled to an output of the second exclusive-OR gate, a third flip-flop having a third input coupled to an output of the third exclusive-OR gate, and a fourth flip-flop having a fourth input coupled to an output of the fourth exclusive-OR gate;

wherein the second exclusive-OR gate receives as input an output from the first flip-flop and an output from the fourth flip-flop, and further directly receives as another input the second input data.

12. The encryption system according to claim 11, wherein the encryption information comprises bit width information.

13. The encryption device according to claim 11, wherein the first exclusive-OR gate receives, as input, a constant 0 bit value, the first input data, and the output from the fourth flip-flop.

14. The encryption device according to claim 13, wherein the second exclusive-OR gate receives as input only the output from the fourth flip-flop, the output from the first flip-flop, and the second input data.

15. The encryption device according to claim 14, wherein the third exclusive-OR gate accepts as input only the third input data and an output from the second flip-flop.

16. A recovery system, comprising:
a configuration file comprising recovery information; and
a recovery device selected by the configuration file, comprising:
a first exclusive-OR gate coupled to a fourth input data, a second exclusive-OR gate coupled to a first input data, a third exclusive-OR gate coupled to a second input data, and a fourth exclusive-OR gate coupled to a third input data; and
a first flip-flop having a first output coupled to the first exclusive-OR gate, a second flip-flop having a second output coupled to the second exclusive-OR gate, a third flip-flop having a third output coupled to the third exclusive-OR gate, and a fourth flip-flop having a fourth output coupled to the fourth exclusive-OR gate;
wherein the second exclusive-OR gate receives as input, the output of the second flip-flop, the first input data, and the fourth input data.

17. The recovery system according to claim 16, wherein the first exclusive-OR gate receives as input only the output from the first flip-flop and the fourth input data.

18. The recovery device according to claim 17, wherein the second exclusive-OR gate receives as input only the output from the second flip-flop, the first input data, and the fourth input data.

19. The recovery device according to claim 18, wherein the third exclusive-OR gate receives as input only the output from the third flip-flop and the second input data.

20. The recovery device according to claim 19, wherein the fourth exclusive-OR gate receives as input only the output from the fourth flip-flop and the third input data.

* * * * *